(12) United States Patent
Kim et al.

(10) Patent No.: US 12,391,226 B2
(45) Date of Patent: Aug. 19, 2025

(54) ELECTRIFIED VEHICLE AND METHOD OF BRAKING CONTROL FOR THE SAME

(71) Applicants: Hyundai Motor Company, Seoul (KR); Kia Corporation, Seoul (KR)

(72) Inventors: Myung Woo Kim, Gyeonggi-do (KR); Dong Hoon Lee, Gyeonggi-do (KR); Jin Kyeom Cho, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 377 days.

(21) Appl. No.: 17/894,767

(22) Filed: Aug. 24, 2022

(65) Prior Publication Data

US 2023/0117473 A1    Apr. 20, 2023

(30) Foreign Application Priority Data

Oct. 18, 2021  (KR) .................. 10-2021-0138320

(51) Int. Cl.
*B60T 8/32* (2006.01)
*B60T 8/58* (2006.01)

(52) U.S. Cl.
CPC .............. *B60T 8/3215* (2013.01); *B60T 8/58* (2013.01); *B60T 2201/02* (2013.01); *B60T 2250/02* (2013.01); *B60T 2250/04* (2013.01); *B60T 2270/604* (2013.01)

(58) Field of Classification Search
CPC . B60T 8/3215; B60T 1/10; B60T 8/58; B60T 2270/60; Y02T 10/72; B60W 10/08; B60W 2554/804
See application file for complete search history.

(56) References Cited

U.S. PATENT DOCUMENTS

| | | | |
|---|---|---|---|
| 2012/0245773 A1* | 9/2012 | Suzuki | B60L 15/20 701/22 |
| 2013/0085650 A1* | 4/2013 | Nakamura | B60W 30/18127 701/70 |
| 2015/0202965 A1* | 7/2015 | Gabor | B60L 7/18 701/70 |
| 2017/0001562 A1* | 1/2017 | Bish | G01S 13/931 |
| 2018/0134161 A1* | 5/2018 | Gaither | B60L 7/26 |
| 2018/0297585 A1* | 10/2018 | Lian | B60T 8/17552 |
| 2021/0179039 A1* | 6/2021 | Kakeshita | B60T 8/171 |

\* cited by examiner

*Primary Examiner* — Wade Miles
*Assistant Examiner* — Mohammed Yousef Abuelhawa
(74) *Attorney, Agent, or Firm* — Fox Rothschild LLP

(57) ABSTRACT

The present disclosure relates to an electrified vehicle capable of handling a situation where there may be an insufficient brake force during long-time braking by applying regenerative braking and to a braking compensation control method of the electric vehicle. The braking compensation control method includes determining whether a preset compensation control entry condition may be satisfied, determining a compensation brake torque for assisting in following a speed of a leading vehicle traveling ahead, and outputting the compensation brake torque through a motor when the compensation control entry condition may be satisfied.

20 Claims, 9 Drawing Sheets

ELECTRIFIED VEHICLE AND METHOD OF BRAKING CONTROL FOR THE SAME

PRIORITY

This application claims under 35 U.S.C. § 119(a) the benefit of Korean Patent Application No. 10-2021-0138320, filed on Oct. 18, 2021, which is hereby incorporated by reference as if fully set forth herein.

BACKGROUND OF THE DISCLOSURE

Field of the Disclosure

The present disclosure relates to an electrified vehicle capable of handling a situation where the mechanical brake force may be insufficient during long-time braking by applying regenerative braking, and to a braking control method for the same. The term "electrified vehicle" refers to a range of technologies that use electricity to propel a vehicle.

Discussion of the Related Art

While driving on a road such as an expressway or highway available for relatively high-speed traveling, a driver may find a vehicle traveling ahead at a relatively low speed at a relatively long distance due to unexpected sudden congestion ahead. Such sudden congestion may be also referred to as a phantom jam or phantom traffic jam. In such a situation, drivers may generally put on the brakes for a relatively long time in consideration of the distance to a leading vehicle traveling ahead at a low speed and the relative speed with respect to the leading vehicle. In this situation, skilled drivers may determine a desirable braking start time and a desirable degree of braking, while elderly or novice drivers may fail to apply a brake force with relatively sufficient space or time. This will be described hereinafter with reference to FIG. 1.

FIG. 1 illustrates an example form of applying a brake force in a long-time braking situation.

Referring to FIG. 1, when long-time braking may be required due to a phantom jam or the like, linearly increasing a brake force over time may be considered ideal braking. However, when a driver may be unfamiliar with driving or poorly recognizes a distance and speed, the driver may apply an extremely insufficient brake force at an initial stage of braking and may then drastically increase the brake force to prevent a collision with a leading vehicle traveling ahead at a low speed after the driver belatedly recognizes the insufficient brake force, which may make passengers on board anxious.

SUMMARY OF THE DISCLOSURE

An object of the present disclosure may be to provide an electrified vehicle capable of compensating for a desirable brake force when a brake force exerted by a driver's operation of a brake pedal may be insufficient in a situation where relatively long-distance and long-time braking may be required such that a speed of the vehicle becomes close to that of a leading vehicle traveling ahead, and a braking control method for the same.

However, technical embodiments of the present disclosure may not be limited to the foregoing aspects, and other technical aspects may also be present. Additional aspects of the disclosure will be set forth in part in the description which follows and, in part, will be apparent from the description, or may be learned by practice of the presented embodiments of the disclosure.

According to an example embodiment, there may be provided a braking compensation control method of an electrified vehicle, the braking compensation control method including determining whether a preset compensation control entry condition may be satisfied, determining a compensation brake torque for assisting in following a speed of a leading vehicle traveling ahead, and outputting the compensation brake torque through a motor when the compensation control entry condition may be satisfied. The determining may include determining whether regenerative braking may be available, and determining a braking condition including a condition associated with whether a specific braking type based on a braking time occurs and a condition associated with whether there may be the insufficient brake amount.

When a single braking time may be greater than a preset first time or when a sum of two or more braking times with a braking interval less than a second time may be greater than the first time, the determining may include determining that the specific braking type occurs.

The determining of the braking condition may include determining a braking momentum based on a brake force applied to the vehicle and the braking time, determining a required braking momentum based on a weight of the vehicle and the relative speed, and determining the insufficient brake amount when the required braking momentum may be greater than the braking momentum.

The determining of the compensation brake torque may include determining a required brake torque based on the required braking momentum and a required braking time based on the relative speed, and determining the compensation brake torque based on the required brake torque, a compensation factor, and a current brake torque.

The required braking time may be determined based on a first map associated with a speed of the electric vehicle and a speed of the leading vehicle.

The required braking time may be determined to decrease as the relative speed increases.

The compensation factor may be determined to increase as the speed of the electric vehicle increases and the braking time increases.

The compensation factor may be determined based on a second map associated with the speed of the electric vehicle and the braking time.

The determining of the compensation brake torque based on the required brake torque, the compensation factor, and the current brake torque may include multiplying, by the compensation factor, a difference between the required brake torque and the current brake torque.

The braking compensation control method may further include suspending outputting the compensation brake torque when the compensation control entry condition may not be satisfied or when the relative speed may be within a predetermined range.

According to another example embodiment, there may be provided an electrified vehicle performing braking compensation control, the electric vehicle including an electric motor connected to a drive shaft, a first controller configured to determine whether a preset compensation control entry condition may be satisfied and determine a compensation brake torque for assisting in following a speed of a leading vehicle traveling ahead, and output a torque command corresponding to the compensation brake torque when the compensation control entry condition may be satisfied, and a second controller configured to control the electric motor based on the torque command. The preset compensation control entry condition may include a regenerative braking available condition, and a braking condition associated with whether a specific braking type based on a braking time occurs and whether there may be the insufficient brake amount.

The first controller may determine that the specific braking type occurs when a single braking time may be greater than a preset first time or a sum of two or more braking times with a braking interval less than a second time may be greater than the first time.

The first controller may determine a braking momentum based on a brake force applied to the vehicle and the braking time, determine a required braking momentum based on a weight of the vehicle and the relative speed, and determine the insufficient brake amount when the required braking momentum may be greater than the braking momentum.

The first controller may determine a required brake torque based on the required braking momentum and a required braking time based on the relative speed, and determine the compensation brake torque based on the required brake torque, a compensation factor, and a current brake torque.

The required braking time may be determined based on a first map associated with the speed of the electric vehicle and the speed of the leading vehicle.

The required braking time may be determined to decrease as the relative speed increases.

The compensation factor may be determined to increase as the speed of the electric vehicle increases and the braking time increases.

The compensation factor may be determined based on a second map associated with the speed of the electric vehicle and the braking time.

The first controller may determine the compensation brake torque by multiplying, by the compensation factor, a difference between the required brake torque and the current brake torque.

The first controller may control an output of the compensation brake torque to be suspended when the compensation control entry condition may not be satisfied or the relative speed may be within a predetermined range.

According to example embodiments described herein, when long-time insufficient braking may be detected in an electrified vehicle, regenerative braking may be performed to compensate for an insufficient brake force, thereby improving safety.

Additional advantages, objects, and features of the disclosure will be set forth in part in the description which follows and in part will become apparent to those having ordinary skill in the art upon examination of the following or may be learned from practice of the disclosure. The objects and other advantages of the disclosure may be realized and attained by the structure particularly pointed out in the written description and claims hereof as well as the appended drawings.

DETAILED DESCRIPTION OF THE DISCLOSURE

Figure 1:
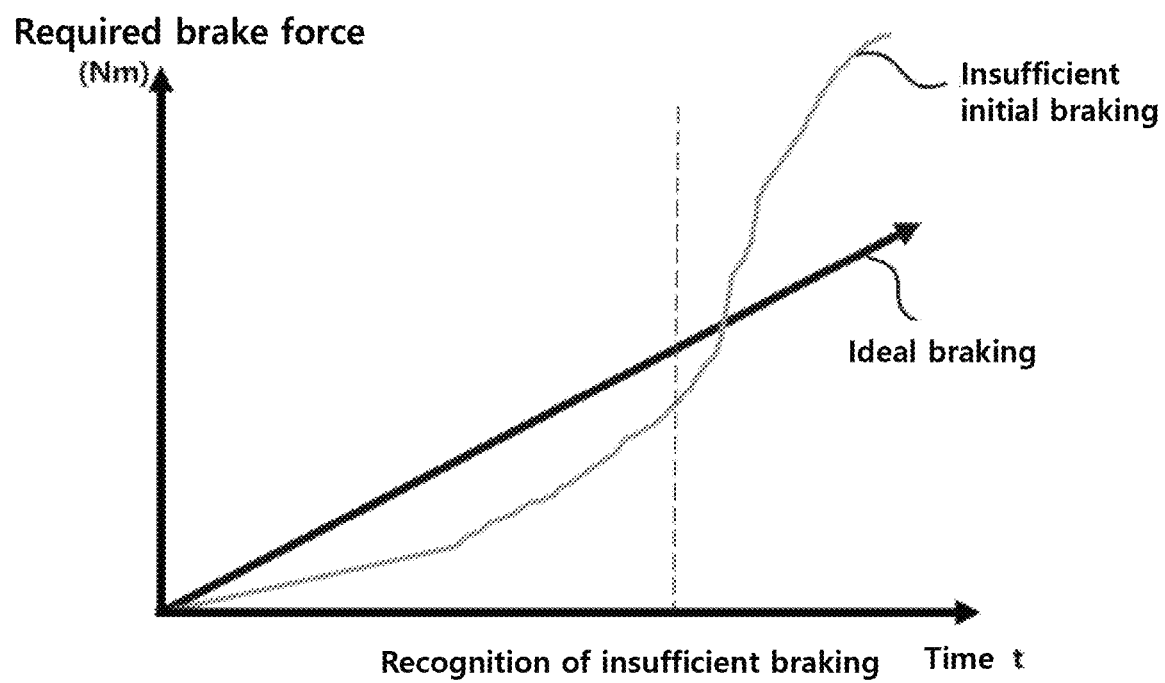
FIG. 1 illustrates an example form of applying a brake force in a long-time braking situation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, embodiments of the present disclosure will be described in detail with reference to the accompanying drawings, and the same or similar elements will be given the same reference numerals regardless of reference symbols, and redundant description thereof will be omitted. In the following description, the terms "module" and "unit" for referring to elements may be assigned and used interchangeably in consideration of convenience of explanation, and thus, the terms per se do not necessarily have different meanings or functions. Further, in describing the embodiments disclosed in the present specification, when it may be determined that a detailed description of related publicly known technology may obscure the gist of the embodiments disclosed in the present specification, the detailed description thereof will be omitted. The accompanying drawings may be used to help easily explain various technical features and it should be understood that the embodiments presented herein may not be limited by the accompanying drawings. As such, the present disclosure should be construed to extend to any alterations, equivalents and substitutes in addition to those which may be particularly set out in the accompanying drawings.

Although terms including ordinal numbers, such as "first", "second", etc., may be used herein to describe various elements, the elements may not be limited by these terms. These terms may be generally only used to distinguish one element from another.

When an element may be referred to as being "coupled" or "connected" to another element, the element may be directly coupled or connected to the other element. However, it should be understood that another element may be present therebetween. In contrast, when an element may be referred to as being "directly coupled" or "directly connected" to another element, it should be understood that there may be no other elements therebetween.

A singular expression includes the plural form unless the context clearly dictates otherwise.

In the present specification, it should be understood that a term such as "include" or "have" may be intended to designate that the features, numbers, steps, operations, elements, parts, or combinations thereof described in the specification may be present, and does not preclude the possibility of addition or presence of one or more other features, numbers, steps, operations, elements, parts, or combinations thereof.

In addition, "unit" or "control unit" included in the names of a motor control unit (MCU), a hybrid control unit (HCU), or the like may be merely a widely used term for naming a controller configured to control a specific vehicle function, and does not indicate a generic functional unit. For example, each controller may include a communication device configured to communicate with another controller or sensor to control a function assigned thereto, a memory configured to store therein an operating system (OS), a logic command, input/output information, or the like, and one or more processors configured to perform determination, calculation, selection, or the like necessary for controlling a function assigned thereto.

Further, when an electrified vehicle described herein may be a vehicle (e.g., a vehicle capable of regenerative braking) including an electric motor directly or indirectly connected to wheels of the vehicle and configured to convert kinetic energy into electrical energy through power generation, the following description may also be applicable to any type of electrified vehicle including, for example, an electric vehicle (EV) and a hybrid electric vehicle (HEV).

According to an example embodiment, when a long-time insufficient-braking situation may be determined while regenerative braking of the vehicle may be available, there may be provided a method of compensating for an insufficient brake amount through regenerative braking to assist in following a speed of a leading vehicle traveling ahead.

The long-time insufficient-braking situation described herein may indicate a situation where a single braking time or a sum of a plurality of braking times with some intervals therebetween may be greater than or equal to a preset time, and narrowing a speed difference from a leading vehicle may be difficult when a current braking amount continues.

Figure 2:
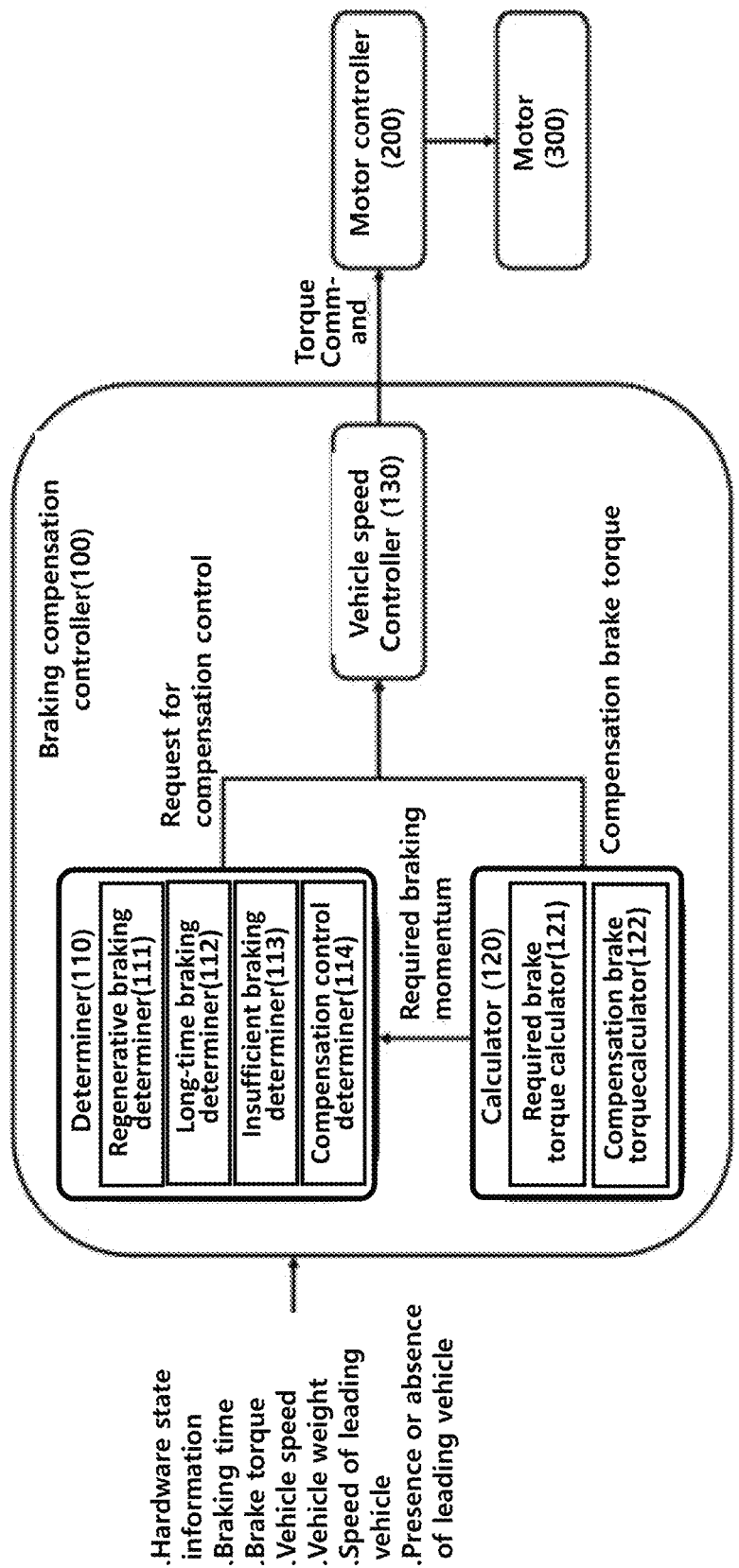
FIG. 2 illustrates an example configuration of an electrified vehicle according to an example embodiment.

FIG. 2 illustrates an example configuration of an electrified vehicle according to an example embodiment.

Referring to FIG. 2, an electrified vehicle according to an example embodiment may include a braking compensation controller 100 configured to determine a long-time insufficient-braking situation and perform braking compensation control, a motor controller 200 configured to control a motor 300 according to a torque command received from the braking compensation controller 100, and the motor 300 connected to a drive shaft.

The braking compensation controller 100 may include a determiner 110, a calculator 120, and a vehicle speed controller 130, and have input information including hardware state information, a braking time, a brake torque, a vehicle speed, a vehicle weight, the presence or absence of a leading vehicle traveling ahead, a speed of the leading vehicle, or the like, and have output information including a torque command corresponding to a regenerative braking torque to be output by the motor 300.

The hardware state information may include state information of electronic components such as a controller, a motor, a battery, and an inverter that may be involved in regenerative braking. The hardware state information may include, for example, at least one of information on the presence or absence of a hardware fault of the motor controller 200 and a braking controller (not shown), information on whether a battery may be overcharged in terms of a state of charge (SOC), and information on whether the motor 300 or the battery may be overheated.

In addition, the information on the brake torque and the braking time may be obtained from the braking controller (e.g., an integrated brake actuation unit (iBAU)), but without being limited thereto. For example, the information on the braking time may be calculated through an integration of an operating time of a brake pedal sensor (BPS), or be a value retained in an upper-level controller (e.g., a vehicle control unit (VCU) or a hybrid control unit (HCU)) that performs overall control on a powertrain.

In addition, the vehicle speed may be obtained from a wheel-speed/vehicle-speed sensor, and the information on the presence or absence of a leading vehicle and the speed of the leading vehicle may be obtained from an advanced driver assistance system (ADAS) controller, and also for the vehicle weight, a prestored value or a value calculated using an acceleration compared to an output of the powertrain may be used, but these may be only examples and the present disclosure may not be limited thereto. To determine the presence or absence of a leading vehicle and the speed of the leading vehicle by the ADAS controller, it may be obvious to a person having ordinary skill in the art that an already commercialized technology for detecting a leading vehicle, a speed thereof, or a relative speed through at least one of a radio detection and ranging (radar) sensor, a light detection and ranging (lidar) sensor, an ultrasonic sensor, and a vision sensor has been used, and a detailed description thereof will thus be omitted here.

The determiner 110 may include a regenerative braking determiner 111, a long-time braking determiner 112, an insufficient-braking determiner 113, and a compensation control determiner 114. The calculator 120 may include a required brake torque calculator 121 and a compensation brake torque calculator 122. The determiner 110 may be configured to request the vehicle controller 130 for compensation control, and the calculator 120 may be configured to transmit a required braking momentum to the determiner 110 and a compensation brake torque to the vehicle speed controller 130.

Hereinafter, the components included in the braking compensation controller 100 will be described in greater detail with reference to FIGS. 3 through 6.

For implementation, the braking compensation controller 100 may be implemented in the form of a function of an upper-level controller (e.g., a VCU for an electric vehicle (EV) or an HCU for a hybrid electric vehicle (HEV)) that performs overall control on a powertrain, but without being limited thereto. For example, the braking compensation controller 100 may be implemented as a separate controller for braking compensation control, or implemented in the form of functions distributed to two or more controllers provided in an electrified vehicle.

The motor 300 may be connected to a drive shaft that rotates along with a wheel to output a regenerative braking torque. The connection to the drive shaft may be construed that, as in an in-wheel motor, a motor may be disposed in a wheel to be directly connected to the wheel, or the motor and the wheel may be connected through at least one power transmitting or disconnecting means such as a transmission, a final reduction gear, a differential gear, and a disconnector present therebetween.

Hereinafter, functions of the components included in the braking compensation controller 100 will be described in greater detail with reference to FIGS. 3 through 6.

Hereinafter, components of the determiner 110 will be described first.

The determiner 110 may include the regenerative braking determiner 111, the long-time braking determiner 112, the insufficient-braking determiner 113, and the compensation control determiner 114, and determine whether an entry condition different for each determiner may be satisfied and transmit a request for compensation control to the vehicle speed controller 130 when each of all the entry conditions may be satisfied.

The regenerative braking determiner 111 may be configured to determine whether regenerative braking may be available for the electrified EV. When regenerative braking may be determined to be available, the regenerative braking determiner 111 may be configured to transmit a regenerative braking condition satisfying signal to the compensation control determiner 114. Main determinant conditions will be described hereinafter with reference to FIG. 3.

Figure 3:
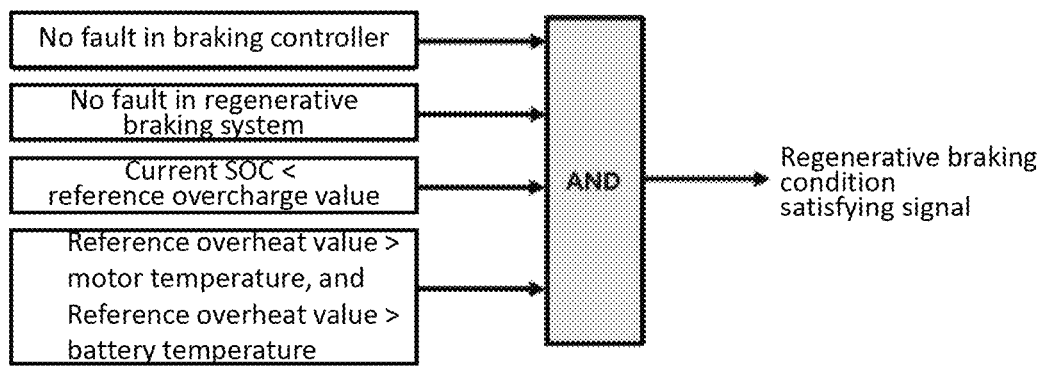
FIG. 3 illustrates an example operation of a regenerative braking determiner according to an example embodiment.

FIG. 3 illustrates an example operation of a regenerative braking determiner according to an example embodiment.

Referring to FIG. 3, conditions for determining whether regenerative braking may be available may include conditions associated with whether there may be any fault in controllers such as a motor controller and a brake controller and hardware, whether SOC overcharge occurs, and whether a motor/battery may be overheated. When all these conditions may be satisfied, the regenerative braking determiner 111 may be configured to determine that regenerative braking may be available, but determine that regenerative braking may be unavailable when any one of the conditions may not be satisfied.

The long-time braking determiner 112 may be configured to determine whether a specific type of braking, i.e., long-time braking, may be currently performed based on the braking time. When a phantom jam occurs in front, a driver may generally operate the brake pedal with a single long step or with several split steps. When the driver operates the brake pedal with the several split steps, an individual operation by step may correspond to a short braking time. However, the driver may psychologically feel that he/she operates the brake for a long period of time. Thus, taking such a psychological aspect in consideration, operating the brake pedal with the divided short steps may also be determined to be a long-time braking. A detailed determination method thereof will be described hereinafter with reference to FIGS. 4a and 4b.

Figure 4A:
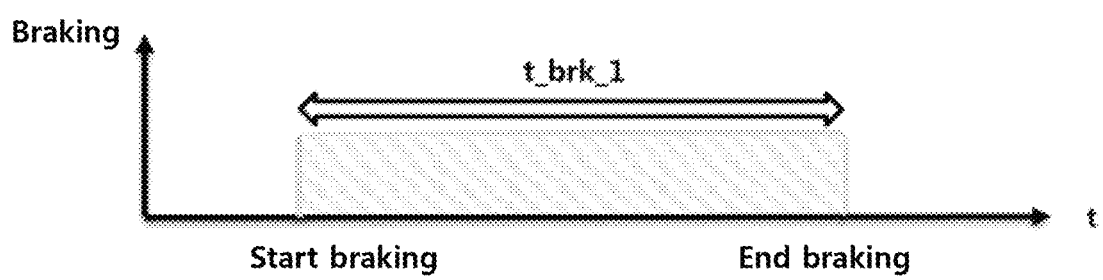
FIGS. 4A and 4B illustrate example methods of determining long-time braking by a long-time braking determiner according to an example embodiment.
Figure 4B:
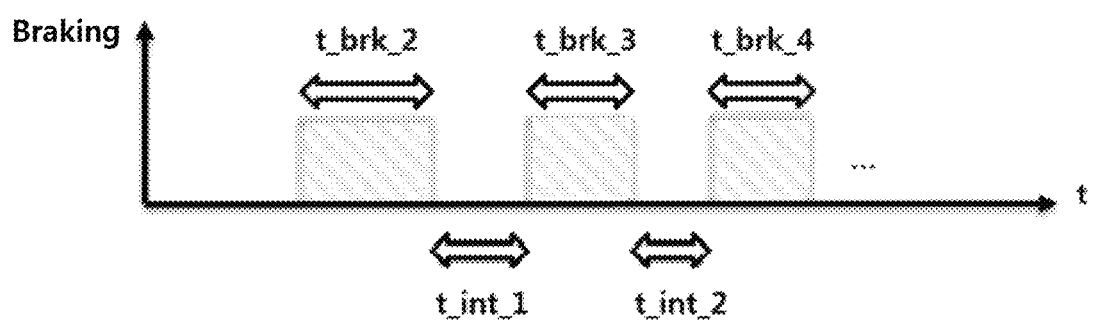

FIGS. 4A and 4B illustrate example methods of determining long-time braking by the long-time braking determiner 112 according to an example embodiment.

Referring to FIG. 4A, a time between a braking start time at which an operation of a brake pedal may be started and a braking end time at which the operation of the brake pedal may be ended may be a braking time (e.g., t_brk_1) for a single braking. When such a single braking time may be greater than a preset reference long-time braking value, the long-time braking determiner 112 may determine the corresponding braking as a long-time braking.

Referring to FIG. 4B, when, although an individual braking time (e.g., t_brk_2, t_brk_3, and t_brk_4) may be less than the preset reference long-time braking value, an interval (e.g., t_int_1 and t_int_2) between braking times may be less than a preset reference interval value, the individual braking times may be summed up and an obtained sum may be compared to the reference long-time braking value.

For example, there may be a case where the reference long-time braking value may be 6 seconds, the reference interval value may be 2 seconds, and three individual braking times (e.g., t_brk_2, t_brk_3, and t_brk_4) may be 3 seconds, 2 seconds, and 2 seconds, respectively, and intervals (e.g., t_int_1 and t_int_2) between two adjacent braking times may be 1.5 seconds and 1 second, respectively. In this case, the intervals t_int_1 and t_int_2 between two braking times may be each less than the reference interval value, and thus the three individual braking times t_brk_2, t_brk_3, and t_brk_4 may all be summed up and the summed braking time may become 7 seconds which may be greater than the reference long-time braking value. Thus, in this case, the brake operation may be determined as a long-time braking.

For another example, there may be a case where the reference long-time braking value may be 6 seconds, the reference interval value may be 2 seconds, three individual braking times (e.g., t_brk_2, t_brk_3, and t_brk_4) may be 3 seconds, 2 seconds, and 2 seconds, respectively, and intervals (e.g., t_int_1 and t_int_2) may be 2.5 seconds and 1.5 seconds, respectively. In this case, the interval t_int_1 between the first braking time t_brk_2 and the second braking time t_brk_3 may be greater than the reference interval value, and thus the first braking time t_brk_2 and the second braking time t_brk_3 may not be summed up, but only the second braking time t_brk_3 and the third braking time t_brk_3 may be summed up. Thus, the total summed braking time may become 4 seconds which may be less than the reference long-time braking value. Thus, in this case, a long-time braking may not be determined.

Each of the reference values described above is provided merely as an example, and thus the reference values may not be limited thereto but may be determined for each vehicle through tests.

Thus, when any one of a single braking time and a sum of braking times occurring within the reference interval value may be greater than the reference long-time braking value, the long-time braking determiner 112 may determine long-time braking and transmit a long-time braking signal to the compensation control determiner 114.

The insufficient-braking determiner 113 may be configured to then calculate a braking momentum by a current operation of the driver, compare the calculated braking momentum to a required braking momentum sufficient to follow a speed of a leading vehicle, and determine whether the current braking performed by the driver may be sufficient or not.

More specifically, the insufficient-braking determiner 113 may be configured to calculate the braking momentum based on the equation for calculating impulse, as represented by Equation 1 below.

$$\text{Braking momentum} = \int F dt \quad \text{[Equation 1]}$$

That is, the braking momentum may be obtained through an integration on the brake force F with respect to the braking time t. The brake force F, which refers to a total brake force of a vehicle, may be a sum of a hydraulic braking force and a regenerative braking force.

When the braking momentum may be calculated, the insufficient-braking determiner 113 may be configured to compare the braking momentum to the required braking momentum. When the braking momentum may be less than the required braking momentum, the insufficient-braking determiner 113 may determine insufficient braking and transmit an insufficient-braking signal to the compensation control determiner 114. In this case, the required braking momentum may be obtained from the required brake torque calculator 121 of the calculator 120, and a detailed method of calculating the required braking momentum will be described hereinafter.

When receiving the regenerative braking condition satisfying signal from the regenerative braking determiner 111, the long-time braking signal from the long-time braking determiner 112, and the insufficient-braking signal from the insufficient-braking determiner 113, the compensation control determiner 114 may be configured to determine an additional condition and determine whether to finally transmit a request for compensation control to the vehicle speed controller 130. The additional condition may be used to prevent the compensation brake torque transmitted from the calculator 120 to the vehicle speed controller 130 from being unnecessarily applied, and may be satisfied when the gearshift may not be at P, R, or N and when a current vehicle speed may be greater than a reference vehicle speed value for determining the application. The reference vehicle speed value for determining the application (i.e., whether to apply the compensation brake torque) may be determined through tests on each vehicle.

Hereinafter, components of the calculator 120 will be described.

The calculator 120 may include the required brake torque calculator 121 and the compensation brake torque calculator 122, each of the calculators 121 and 122 may calculate and output, permanently, output information, yet may output a default value (e.g., 0) when there may be no leading vehicle traveling ahead or the determiner 110 does not output a request for compensation control.

When there may be a leading vehicle, the required brake torque calculator 121 may be configured to calculate a brake torque to be applied to the host vehicle in order to match a speed of the host vehicle to a speed of the leading vehicle. The host vehicle described herein may be an electrified EV according to an example embodiment, and the leading vehicle may be a vehicle traveling ahead of the host vehicle. Before calculating the brake torque, the required brake torque calculator 121 may be configured to calculate a required braking momentum which may be a quantity of a momentum that needs to be reduced to match a current speed of the host vehicle to the speed of the leading vehicle based on the relative speed with respect to the leading vehicle, as represented by Equation 2 below.

$$\text{Required braking momentum} = \text{vehicle weight} * (\text{speed of host vehicle} - \text{speed of leading vehicle}) \quad \text{[Equation 2]}$$

In addition, when the required braking momentum may be calculated as represented by Equation 2, a required brake torque may be calculated as represented by Equation 3 below.

$$\text{Required brake torque} = \text{required braking momentum} * \text{dynamic wheel radius} / \text{required braking time} \quad \text{[Equation 3]}$$

The dynamic wheel radius may be a value stored in advance in the required brake torque calculator 121, and the required braking time may be determined with reference to a map determined in advance.

Hereinafter, the map to be referred to determine the required braking time will be described with reference to FIG. 5.

Figure 5:
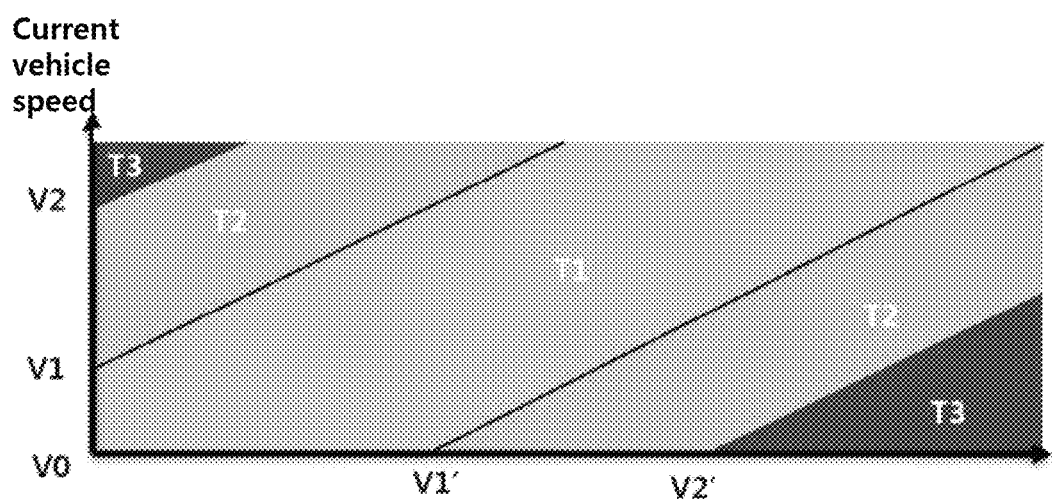
FIG. 5 illustrates an example method of determining a required braking time by a required brake torque calculator according to an example embodiment.

FIG. 5 illustrates an example method of determining a required braking time by a required brake torque calculator according to an example embodiment.

Referring to FIG. 5, a required braking time map may be configured in the form of a two-dimensional (2D) map, in which one axis indicates a speed of a leading vehicle and the other axis indicates a current speed of a host vehicle. Here, conditions, for example, V2>V1>V0, V2'>V1'>V0', and T3>T2>T1, may be satisfied. That is, as a relative speed (e.g., a speed difference between the leading vehicle and the host vehicle) may be lower, the required braking time may be set to be longer. However, when the relative speed may be great such as in a case in which the speed of the leading vehicle may be low although the speed of the host vehicle may be high, the required braking time may need to be set to be shorter for a quick response. The map illustrated in FIG. 5 is provided merely as an example, and thus the form of areal division, the number of intervals, and the like may be changed in various ways, and actual values may be determined through a test for each vehicle.

The compensation brake torque calculator 122 may then calculate a compensation brake torque to be applied to the vehicle speed controller 130. The compensation brake torque may be calculated by applying a compensation factor to a difference between the required brake torque and the current brake torque, as represented by Equation 4 below.

$$\text{Compensation brake torque} = \text{compensation factor} * (\text{required brake torque} - \text{current brake torque}) \quad [\text{Equation 4}]$$

The compensation factor may be determined based on a vehicle speed and a braking time. Hereinafter, a detailed method of determining the compensation factor will be descried with reference to FIG. 6.

Figure 6:
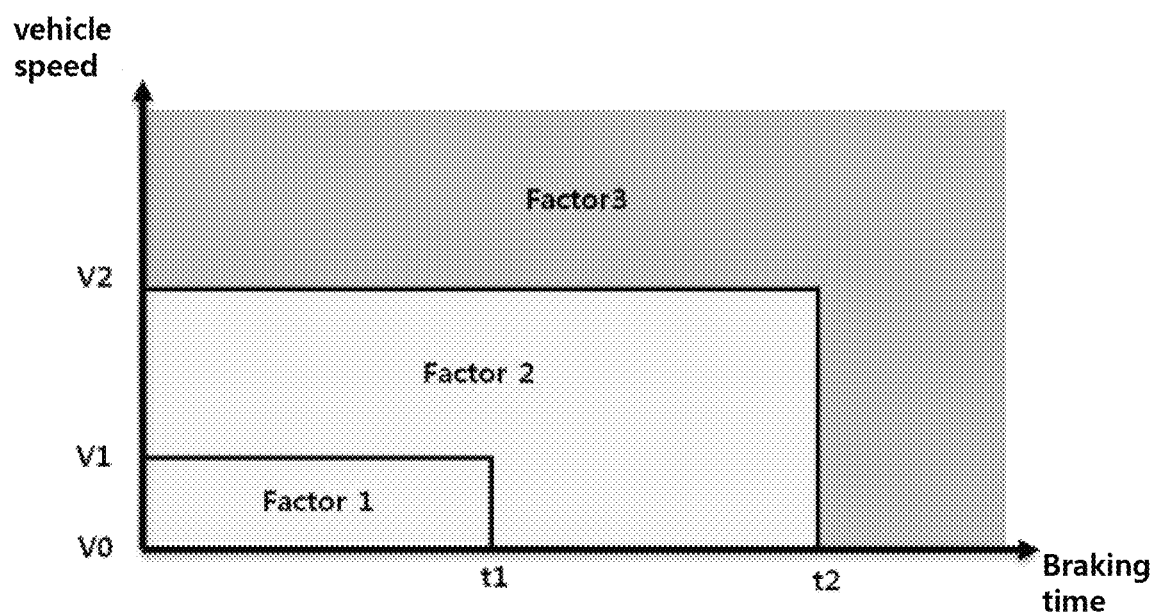
FIG. 6 illustrates an example method of determining a compensation factor by a compensation brake torque calculator according to an example embodiment.

FIG. 6 illustrates an example method of determining a compensation factor by a compensation brake torque calculator according to an example embodiment.

Referring to FIG. 6, a compensation factor map may be configured in the form of a 2D map, in which one axis indicates a speed of a leading vehicle and the other axis indicates a current speed of a host vehicle. Here, conditions, for example, V2>V1>V0, t2>t1, and Factor 3>Factor 2>Factor 1, may be satisfied. This compensation factor map may be configured such that a compensation factor that may compensate for a greater value may be selected when the speed may be high and the braking time may be longer. When there may be a request for compensation control from the determiner 110, the vehicle speed controller 130 may determine a regenerative braking torque to be output by the motor 300 such that the compensation brake torque transmitted from the calculator 120 may be added to the brake force of the vehicle, and transmit a corresponding torque command to the motor controller 200, thereby allowing the speed of the host vehicle to follow the speed of the leading vehicle. In addition, when the request for compensation control may not be transmitted from the determiner 110 because the condition for braking compensation control may not be satisfied, or when the difference between the speed of the host vehicle and the speed of the leading vehicle may be less than or equal to a predetermined value, the vehicle speed controller 130 may suspend outputting the torque command, that is, end the braking compensation control.

The motor controller 200 may control the motor 300 according to the torque command, and control the motor 300 to output a torque obtained by summing up a motor torque based on an operation of the brake pedal by a driver and a motor torque corresponding to the torque command output by the vehicle speed controller 130. For example, when a regenerative braking torque by the operation of the brake pedal by the driver may be 10 Nm and a torque command of the vehicle speed controller 130 corresponds to 5 Nm, the motor controller 200 may control the motor 300 to output a total of 15 Nm regenerative braking torque.

In addition, when the braking compensation controller 100 may be implemented as a VCU or HCU as described above, the torque command to be transmitted to the motor controller 200 may be in the form of a torque command corresponding to a torque obtained by summing an assigned torque of the motor 300 of a torque corresponding to the pedal operation by the driver (that is, a torque or brake force required by the driver) and the compensation brake torque calculated by the calculator 120.

The foregoing components of the vehicle may enable desirable compensation control even when there may be insufficient braking by a driver's operation during long-time braking due to a leading vehicle, and may finally reduce a speed of the vehicle according to a speed of the leading vehicle.

A flowchart of the braking compensation control process described above may be illustrated in FIG. 7.

Figure 7:
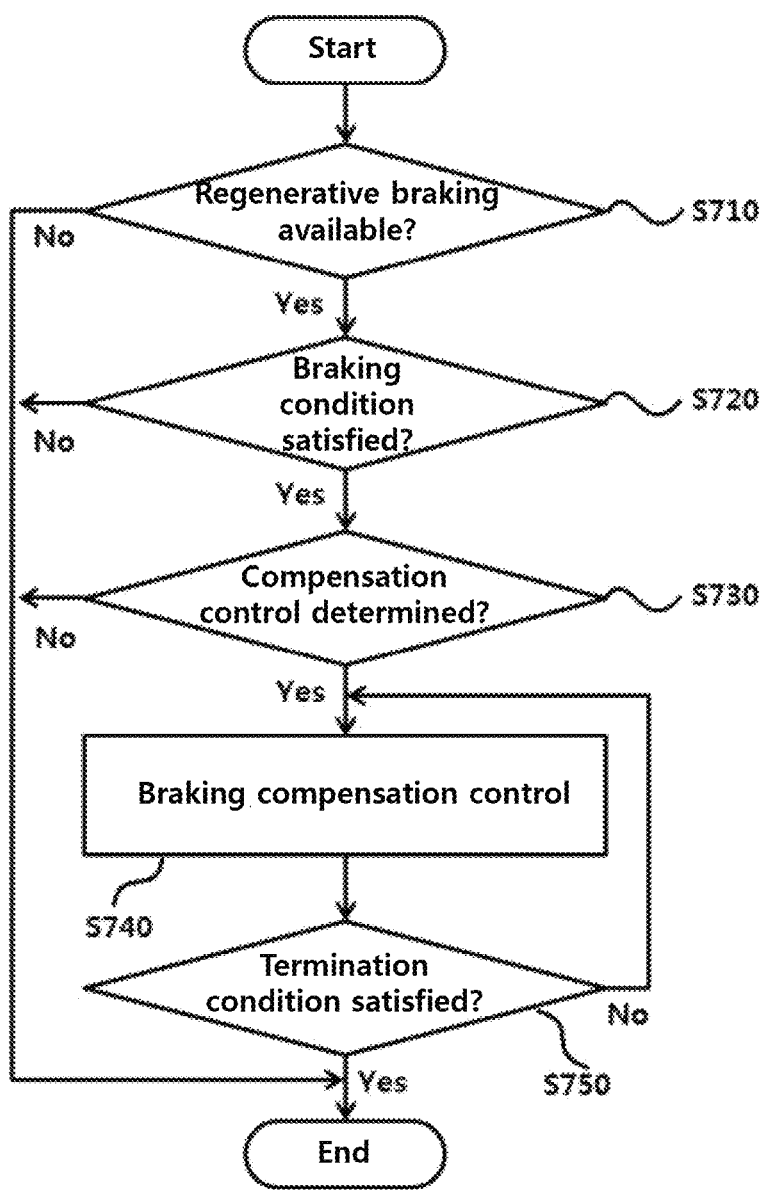
FIG. 7 is a flowchart illustrating an example method of performing braking compensation control in a long-time insufficient-braking situation for an electrified vehicle according to an example embodiment.

FIG. 7 is a flowchart illustrating an example method of performing braking compensation control in a long-time insufficient-braking situation for an electrified EV according to an example embodiment.

Referring to FIG. 7, the determiner 110 may determine whether to perform compensation control in step S730 based on results of step S710 of determining whether regenerative braking is available and step S720 of determining whether a braking condition is satisfied or not.

As described above, step S710 of determining whether regenerative braking is available may be performed by the regenerative braking determiner 111, and whether long-time braking is performed may be determined as the braking condition by the long-time braking determiner 112 and whether there is insufficient braking may be determined as the braking condition by the insufficient-braking determiner 113. In addition, S730 of determining whether to perform compensation control may be determined by the compensation control determiner 114, and a detailed determining method may be the same as what has been described above and a repeated description thereof will be omitted here.

In step S740, when an entry into braking compensation control is determined ("Yes" in S730), the braking compensation control may be performed as the vehicle speed controller 130 may transmit a torque command to the motor controller 200 based on a compensation brake torque calculated in the calculator 120 and the motor controller 200 may control the motor 300 based on the torque command. In step S750, the vehicle speed controller 130 may continuously determine whether a termination condition is satisfied, and the braking compensation control may be terminated when the termination condition is satisfied ("Yes" in S750). The termination condition described herein may indicate a condition where a request for the braking compensation control is not transmitted from the determiner 110 or a difference between a speed of a host vehicle and a speed of a leading vehicle is less than or equal to a preset value.

Figure 8:
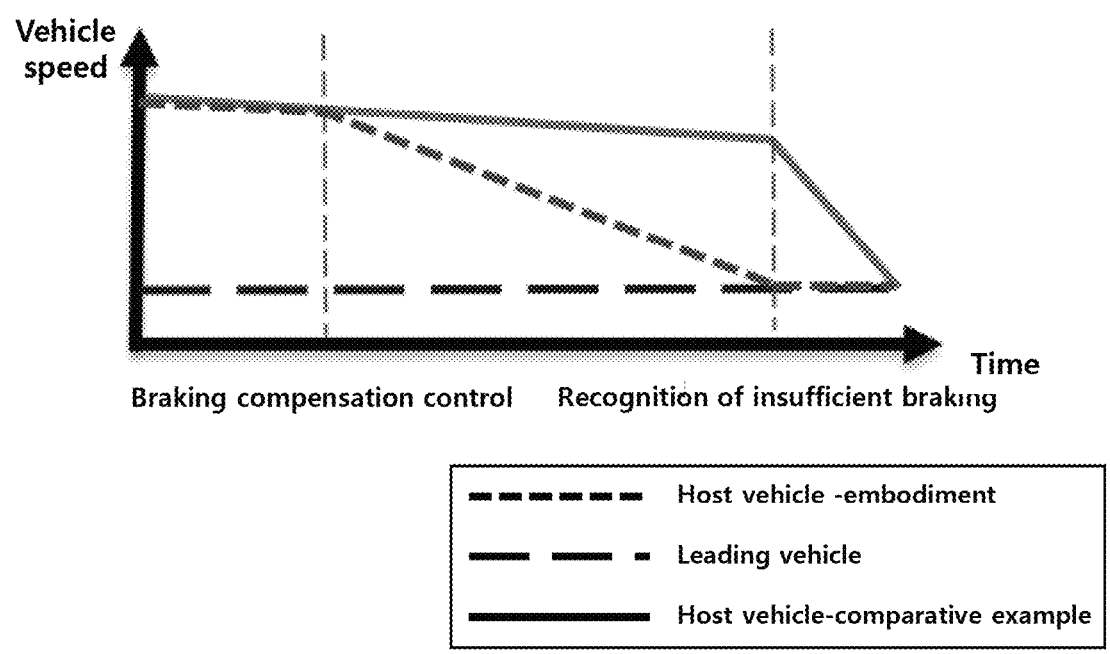
FIG. 8 illustrates example effects according to example embodiments.

FIG. 8 illustrates example effects according to example embodiments.

Referring to FIG. 8, in a comparative example where a driver is relatively late in recognizing insufficient braking, an insufficient brake force may be applied at an initial stage of long-time braking, and rapid braking may then be performed belatedly when the driver recognizes the insufficient braking so as to follow a speed of a leading vehicle. However, according to an example embodiment, as the braking compensation controller 100 may determine a long-time braking and insufficient braking situation when regenerative braking is available, braking compensation control may start and a compensation brake torque may then be additionally applied to a brake torque that is based on an operation of the driver. Thus, it is possible to stably follow the speed of the leading vehicle.

On the other hand, the present disclosure described above may be embodied as computer-readable code on a medium in which a program may be recorded. The computer-readable medium includes all types of recording devices in which data readable by a computer system may be stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc. Therefore, the above detailed description should not be construed as restrictive and should be considered as illustrative in all respects. The scope of the present disclosure should be determined by a reasonable interpretation of the appended claims, and all modifications within the equivalent scope of the present disclosure may be included in the scope of the present disclosure.

What is claimed is:

1. A braking compensation control method of an electric vehicle, comprising:
    determining whether a preset compensation control entry condition is satisfied including determining whether a specific braking type occurs based on a braking time that a driver operates a brake pedal;
    determining a compensation brake torque for compensating for an insufficient brake amount that is based on a relative speed with respect to a leading vehicle traveling ahead to assist in following a speed of the leading vehicle; and
    when the compensation control entry condition is satisfied, outputting the compensation brake torque through a motor for regenerative braking.

2. The braking compensation control method of claim 1, wherein the determining of whether the compensation control entry condition is satisfied further comprises:
    determining whether regenerative braking is available; and
    determining whether the brake amount is insufficient.

3. The braking compensation control method of claim 2, wherein determining whether the specific braking type occurs based on the braking time comprises:
    when a single braking time is greater than a preset first time or when a sum of two or more braking times with a braking interval less than a second time is greater than the first time, determining that the specific braking type occurs.

4. The braking compensation control method of claim 2, wherein determining whether the brake amount is insufficient comprises:
    determining a braking momentum based on a brake force applied to the electric vehicle and the braking time;
    determining a required braking momentum based on a weight of the electric vehicle and the relative speed; and
    when the required braking momentum is greater than the braking momentum, determining the brake amount is insufficient.

5. The braking compensation control method of claim 4, wherein the determining of the compensation brake torque comprises:
    determining a required brake torque based on the required braking momentum and a required braking time based on the relative speed; and
    determining the compensation brake torque based on the required brake torque, a compensation factor, and a current brake torque.

6. The braking compensation control method of claim 5, wherein the required braking time is determined based on a first map associated with a speed of the electric vehicle and the speed of the leading vehicle.

7. The braking compensation control method of claim 5, wherein the required braking time is determined to decrease as the relative speed increases.

8. The braking compensation control method of claim 5, wherein the compensation factor is determined to increase as a speed of the electric vehicle increases and the braking time increases.

9. The braking compensation control method of claim 5, wherein the compensation factor is determined based on a second map associated with a speed of the electric vehicle and the braking time.

10. The braking compensation control method of claim 5, wherein the determining of the compensation brake torque based on the required brake torque, the compensation factor, and the current brake torque comprises:
    multiplying, by the compensation factor, a difference between the required brake torque and the current brake torque.

11. The braking compensation control method of claim 1, further comprising:
    when the compensation control entry condition is not satisfied or when the relative speed is within a predetermined range, suspending outputting the compensation brake torque.

12. An electric vehicle performing braking compensation control, the electric vehicle comprising:
    an electric motor connected to a drive shaft;
    a first controller configured to determine whether a preset compensation control entry condition is satisfied and determine a compensation brake torque for compensating for an insufficient brake amount based on a relative speed with respect to a leading vehicle traveling ahead to assist in following a speed of the leading vehicle, and output a torque command corresponding to the compensation brake torque when the compensation control entry condition is satisfied; and
    a second controller configured to control the electric motor based on the torque command for regenerative braking,
    wherein determining whether a preset compensation control entry condition is satisfied comprises determining whether a specific braking type occurs based on a braking time that a driver operates a brake pedal.

13. The electric vehicle of claim 12, wherein the preset compensation control entry condition further comprises:
    a regenerative braking available condition; and
    a braking condition associated with whether the brake amount is insufficient.

14. The electric vehicle of claim 13, wherein the first controller is configured to:
    when a single braking time is greater than a preset first time or a sum of two or more braking times with a braking interval less than a second time is greater than the first time, determine that the specific braking type occurs.

15. The electric vehicle of claim 13, wherein the first controller is configured to:
    determine a braking momentum based on a brake force applied to the electric vehicle and the braking time,
    determine a required braking momentum based on a weight of the electric vehicle and the relative speed, and determine that the brake amount is insufficient when the required braking momentum is greater than the braking momentum.

16. The electric vehicle of claim 15, wherein the first controller is configured to:
    determine a required brake torque based on the required braking momentum and a required braking time based on the relative speed, and determine the compensation brake torque based on the required brake torque, a compensation factor, and a current brake torque.

17. The electric vehicle of claim 16, wherein the required braking time is determined based on a first map associated with a speed of the electric vehicle and the speed of the leading vehicle.

18. The electric vehicle of claim 16, wherein the compensation factor is determined to increase as a speed of the electric vehicle increases and the braking time increases, or the compensation factor is determined based on a second map associated with the speed of the electric vehicle and the braking time.

19. The electric vehicle of claim 16, wherein the first controller is configured to:
   determine the compensation brake torque by multiplying, by the compensation factor, a difference between the required brake torque and the current brake torque.

20. The electric vehicle of claim 12, wherein the first controller is configured to control output of the compensation brake torque to be suspended, when the compensation control entry condition is not satisfied or the relative speed is within a predetermined range.

* * * * *